United States Patent
Arany-Kovacs et al.

(10) Patent No.: US 10,981,665 B2
(45) Date of Patent: Apr. 20, 2021

(54) SYSTEM AND METHOD FOR AERIAL REFUELING DOOR ACTUATION

(71) Applicant: THE BOEING COMPANY, Chicago, IL (US)

(72) Inventors: Steven T. Arany-Kovacs, Monroe, WA (US); Eric D. Blohm, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 671 days.

(21) Appl. No.: 15/864,883

(22) Filed: Jan. 8, 2018

(65) Prior Publication Data

US 2019/0210738 A1    Jul. 11, 2019

(51) Int. Cl.
*B64D 39/06* (2006.01)
*B64C 1/14* (2006.01)

(52) U.S. Cl.
CPC .............. *B64D 39/06* (2013.01); *B64C 1/14* (2013.01); *B64C 1/1407* (2013.01)

(58) Field of Classification Search
CPC .......... B64D 39/06; B64C 1/14; B64C 1/1407
See application file for complete search history.

(56) References Cited

U.S. PATENT DOCUMENTS

| | | | |
|---|---|---|---|
| 6,349,899 B1 * | 2/2002 | Ralston | B64D 33/02 244/53 B |
| 7,458,543 B2 * | 12/2008 | Cutler | B64D 39/00 244/135 A |
| 2010/0181435 A1 * | 7/2010 | Sakurai | B64C 21/02 244/209 |

* cited by examiner

*Primary Examiner* — Valentina Xavier
(74) *Attorney, Agent, or Firm* — Moore Intellectual Property Law, PLLC (57) ABSTRACT

A device includes a drive link coupled to an actuator and a first link coupled to the drive link, the first link and the drive link forming a first pivot point. The device also includes a second link coupled to the first link and a support shaft coupled to second link. The second link and the first link form a second pivot point and the second link is configured to rotate about the support shaft. The device further includes a third link coupled to the second link and includes a fourth link coupled to third link and coupled to a door assembly. The third link and the second link form a third pivot point, and the fourth link and the third link form a fourth pivot point. When the door assembly is in an open position, the support shaft, the third pivot point, and the fourth pivot point are aligned.

20 Claims, 8 Drawing Sheets

Responsive to rotation of a driveshaft of an actuator in a first direction, opening a door assembly, where opening the door assembly includes rotating a drive link about the driveshaft to drive a first link, rotating a second link about a support shaft, driving a third link, and rotating a fourth link mechanically coupled to a door assembly drive linkage, and where the second link and the third link are aligned on-center when the door assembly is in an open state

704

Responsive to rotation of the driveshaft in a second direction, closing the door assembly, where closing the door assembly includes rotating the drive link about the driveshaft to drive the first link, rotating the second link about the support shaft, driving the third link, and rotating the fourth link, and where the first link and at least a portion of the drive link are aligned on-center when the door assembly is in a closed state

SYSTEM AND METHOD FOR AERIAL REFUELING DOOR ACTUATION

GOVERNMENT LICENSE RIGHTS

The invention described herein was made with Government support under contract number FA8625-11-C-6600 awarded by Department of Defense. The Government has certain rights in this invention.

FIELD OF THE DISCLOSURE

The present disclosure is generally related to aerial refueling receptacle doors.

BACKGROUND

Aerial refueling doors are commonly used when refueling an aircraft in-flight via a refueling boom of another aircraft. Conventional aerial refueling doors, such as on the KC-135 Stratotanker, are opened and closed using hydraulic actuators. A robust and complex locking actuator or lock mechanism is used to withstand operational forces to keep the aerial refueling doors open or keep the aerial refueling doors closed. Additionally, the aerial refueling doors include a mechanical linkage that provides a load path from the aerial refueling doors to the actuator. Thus, a robust and complex actuator is used to withstand operational forces (e.g., loads incurred from wind, bird strikes, boom strikes, etc.) and to provide sufficient force for operating requirements (e.g., to break free an iced door when opening the aerial refueling doors). The robust and complex actuator adds cost and complexity to the aerial refueling door system and to the aircraft.

Some aerial refueling systems may use a hydraulic actuator to keep the aerial refueling doors closed during operation. However, civilian aircraft (i.e., aircraft certified as civilian aircraft by the Federal Aviation Administration) cannot use hydraulic actuation inside a pressurized area of an aircraft.

SUMMARY

In a particular implementation, a device includes a drive link mechanically coupled to an actuator and a first link rotatably coupled to the drive link, the first link and the drive link forming a first pivot point. The device also includes a second link rotatably coupled to the first link, the second link and the first link forming a second pivot point. The device also includes a support shaft coupled to second link, where the second link is configured to rotate about the support shaft. The device further includes a third link rotatably coupled to the second link, the third link and the second link forming a third pivot point. The device also includes a fourth link rotatably coupled to third link and mechanically coupled to a door assembly, the fourth link and the third link forming a fourth pivot point. When the door assembly is in an open position, the support shaft, the third pivot point, and the fourth pivot point are aligned.

In another particular implementation, an aircraft includes a door assembly and an actuator including a driveshaft. The actuator is configured to open and close the door assembly. The aircraft also includes double on-center mechanical linkage coupled to the door assembly and coupled to the actuator. The double on-center mechanical linkage is configured to have a first set of links in an on-center configuration when the door assembly is in an open state and a second set of links in an on-center configuration when the door assembly is in a closed state.

In another particular implementation, a method of operating an aerial refueling door includes, responsive to rotation of a driveshaft of an actuator in a first direction, opening a door assembly. Opening the door assembly includes rotating a drive link about the driveshaft to drive a first link, rotating a second link about a support shaft, driving a third link, and rotating a fourth link mechanically coupled to a door assembly drive linkage, such that the second link and the third link are aligned on-center when the door assembly is in an open state. The method also includes, responsive to rotation of the driveshaft in a second direction, closing the door assembly. Closing the door assembly includes rotating the drive link about the driveshaft to drive the first link, rotating the second link about the support shaft, driving the third link, and rotating the fourth link, such that the first link and at least a portion of the drive link are aligned on-center when the door assembly is in a closed state.

DETAILED DESCRIPTION

Implementations disclosed herein are directed to systems and methods for operating an aerial refueling door system. The aerial refueling door system may be included on a vehicle, such as an aircraft. An exemplary aerial refueling door system includes a door assembly, having a first door and a second door, and a door actuation system. The door actuation system includes an actuator (e.g., an electric motor) coupled to the door assembly via mechanical linkage. The mechanical linkage has a double "on-center" configuration. For example, the mechanical linkage includes a double "on-center" driving linkage coupled to the actuator.

As used herein, a double on-center driving linkage refers to a drive linkage that has a first on-center configuration when the door assembly is closed and has a second on-center configuration when the door assembly is open, hence double on-center. For example, the driving linkage is arranged such that a first set of links of the driving linkage have an on-center configuration when the door assembly is closed (a first on-center configuration) and a second set of links of the driving linkage have an on-center configuration when the door assembly is open (a second on-center configuration). A set of links (e.g., two or more links) with an on-center configuration will form or cause three or more pivot points associated with the two or more links to be aligned (or substantially aligned), i.e., collinear or substantially collinear. Substantially aligned includes aligned within manufacturing tolerances or aligned within plus or minus 5 degrees. Alignment within plus or minus 5 degrees reduces loads from the door assembly from generating a moment and rotational forces. The double on-center configuration of the mechanical linkage/driving linkage protects the actuator from operational forces in the open position during refueling operations, prevents uncommanded door movement when the actuator losses power, and increases mechanical advantage for operational requirements when opening the door assembly.

With this double on-center configuration, the actuator can be smaller since the double on-center configuration protects the actuator from large operational loads. Accordingly, the actuator can be substantially smaller and lighter. Additionally, the actuator would also use substantially less electric power, leading to lighter gage wiring, reduced power controllers, and less power demand on the aerial refueling system.

The mechanical linkage and driving linkage are arranged such that the mechanical linkage and driving linkage provide a load path directly to structure (e.g., a support structure or shaft), rather than to the actuator. Providing a load path to the structure, protects the actuator from large operational loads that could damage the actuator (e.g., teeth of the actuator). In addition, the mechanical linkage provides sufficient mechanical advantage to increase the force output by the actuator to break free an iced door upon activation opening and to overcome door-closing air loads (e.g., air resistance from closing the door assembly).

The mechanical linkage may further include door linkage coupled to the door assembly and the driving linkage such that activation of the actuator drives and rotates the driving linkage to open the door assembly via the door linkage. In some implementations, the mechanical linkage may include one or more four-bar linkages. For example, the driving linkage may include two four-bar linkages and the door linkage may include one or more four-bar linkages. In other implementations, the mechanical linkage includes other types of linkages, such as five-bar, six-bar, or eight-bar linkages.

Using mechanical linkage having a double on-center configuration allows the aerial refueling door system to use electric actuators, which reduces complexity, cost, and weight of the aerial refueling door system. Additionally, because an electric actuator can be used, the aerial refueling door system can be certified as a civilian aircraft.

Figure 1:
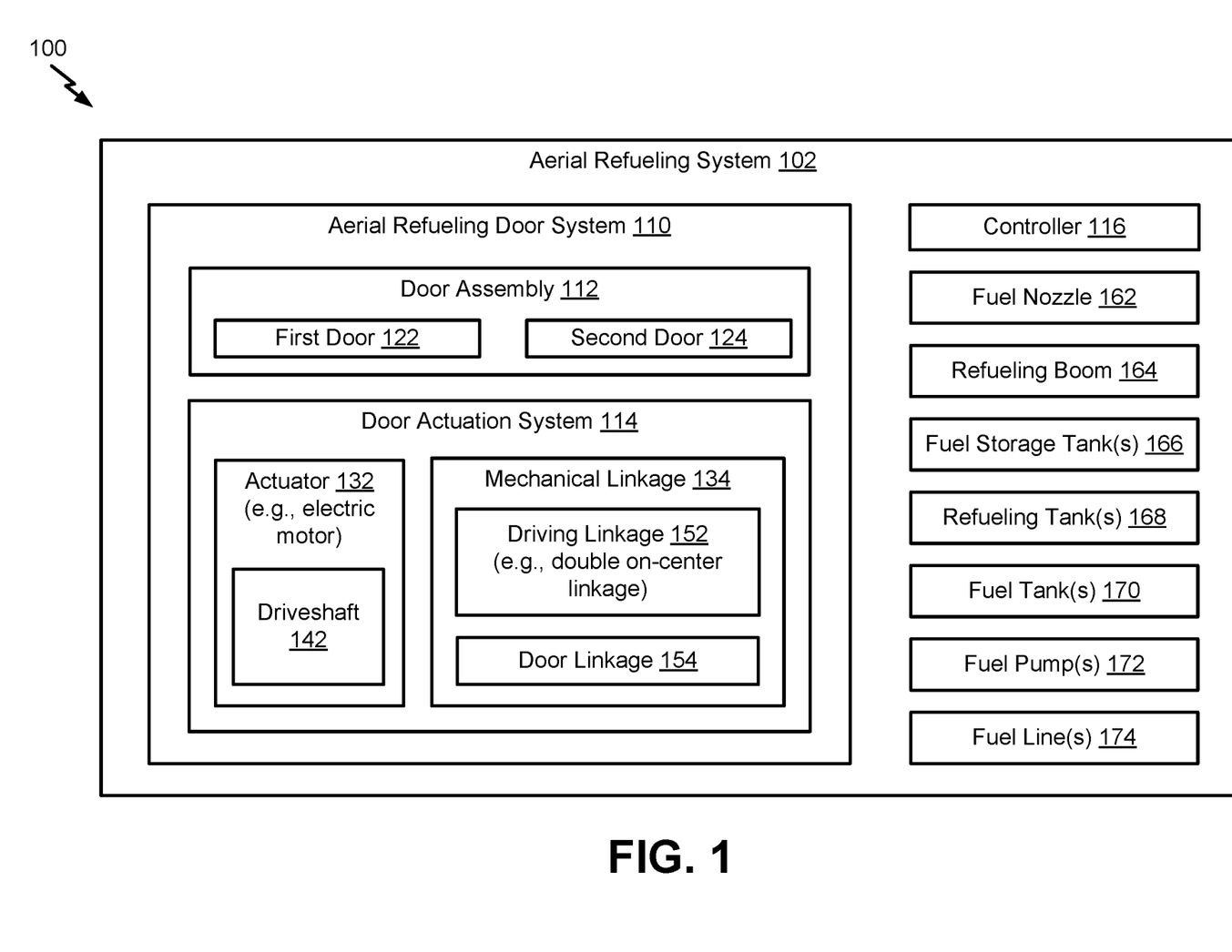
FIG. 1 is a block diagram that illustrates an example of a system for operating an aerial refueling door.

FIG. 1 illustrates an example block diagram 100 of an aerial refueling system 102. The aerial refueling system 102 is included on a vehicle, such as an aircraft 202 illustrated in FIG. 2. The aerial refueling system 102 enables in-flight refueling of the vehicle.

The aerial refueling system 102 includes an aerial refueling door system 110. The aerial refueling door system 110 is configured to control access to a fuel nozzle 162 of the aerial refueling system 102. The aerial refueling door system 110 includes a door assembly 112 and a door actuation system 114. The door assembly 112 includes at least a first door 122. In some implementations, such as the implementation illustrated in FIG. 1, the door assembly 112 further includes a second door 124. The door assembly 112, the first door 122, and the second door 124 are further described with reference to FIGS. 2-6.

The door actuation system 114 includes an actuator 132 and mechanical linkage 134. The actuator 132 includes a driveshaft 142 and is configured to open and close the door assembly 112 via the mechanical linkage 134, as described further with reference to FIGS. 5 and 6. In some implementations, the actuator 132 includes or corresponds to an electric actuator, such as a rotary electric motor. As illustrative, non-limiting examples, the actuator 132 includes or corresponds to a brushed direct current (DC) electric motor, a brushless DC electric motor, or a three phase alternating current (AC) electric motor. In other implementations, the actuator 132 includes or corresponds to a gas-powered motor, a hydraulic motor, or a hybrid motor. The actuator 132 may be coupled to the mechanical linkage 134 (e.g., the driving linkage 152) via teeth, such as teeth 542 shown in FIG. 5.

The mechanical linkage 134 includes one or more members or links which form moveable joints (e.g., rotatable joints). The links or members of the mechanical linkage 134 may be coupled together by fasteners, such as pins or shoulder bolts, as illustrative, non-limiting examples, to form the moveable joints (e.g., revolute joints). The mechanical linkage 134 is configured to open the door assembly 112 responsive to rotation of the driveshaft 142 of the actuator 132. For example, rotation in a first direction (e.g., clockwise) opens the door assembly 112 and rotation in a second direction (e.g., counter-clockwise) closes the door assembly 112.

Figure 5:
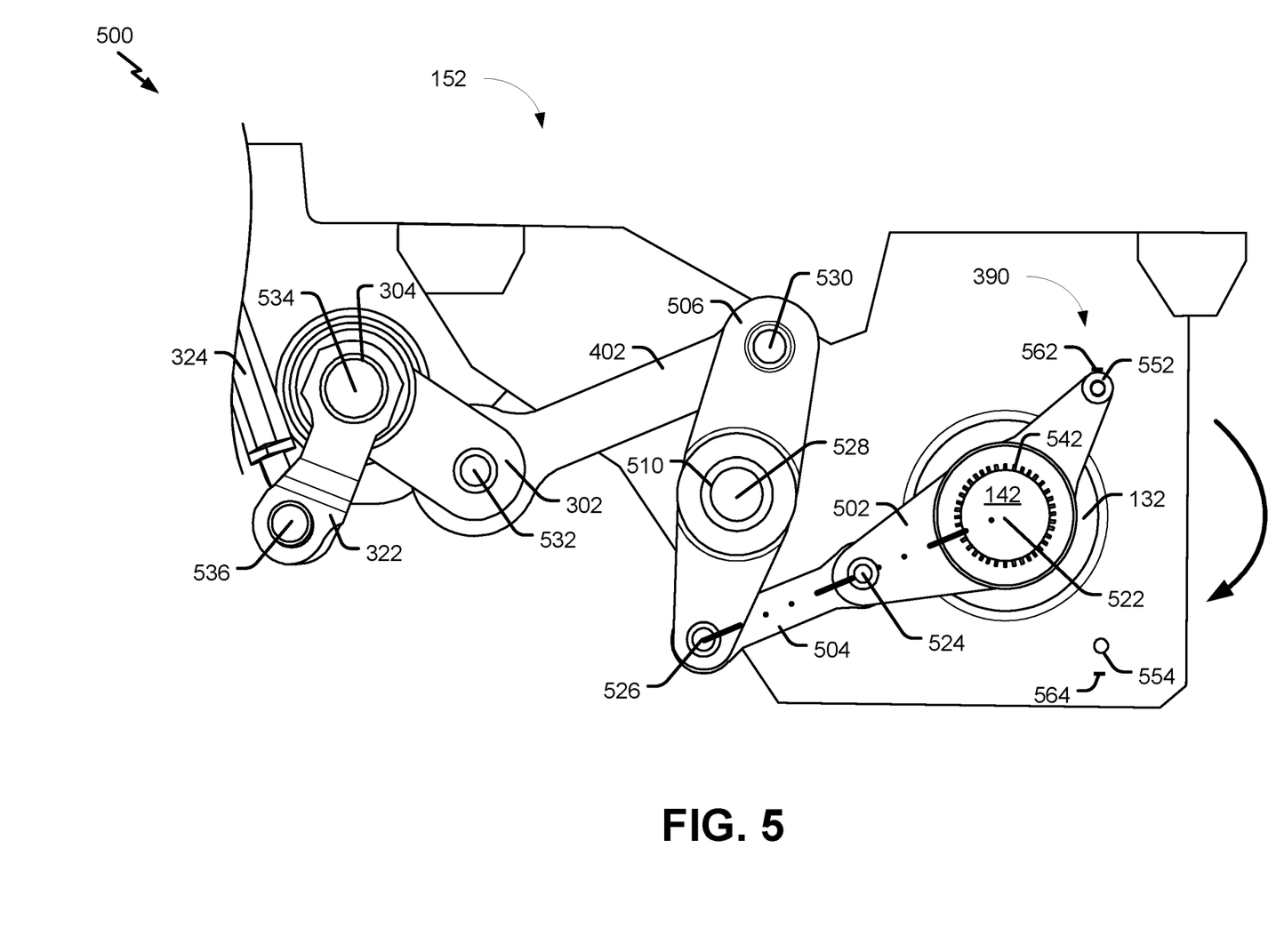
FIG. 5 is a diagram that illustrates a detailed side view of an example of a double on-center mechanical linkage, which is illustrated in the closed state, of the system for operating the aerial refueling door.
Figure 6:
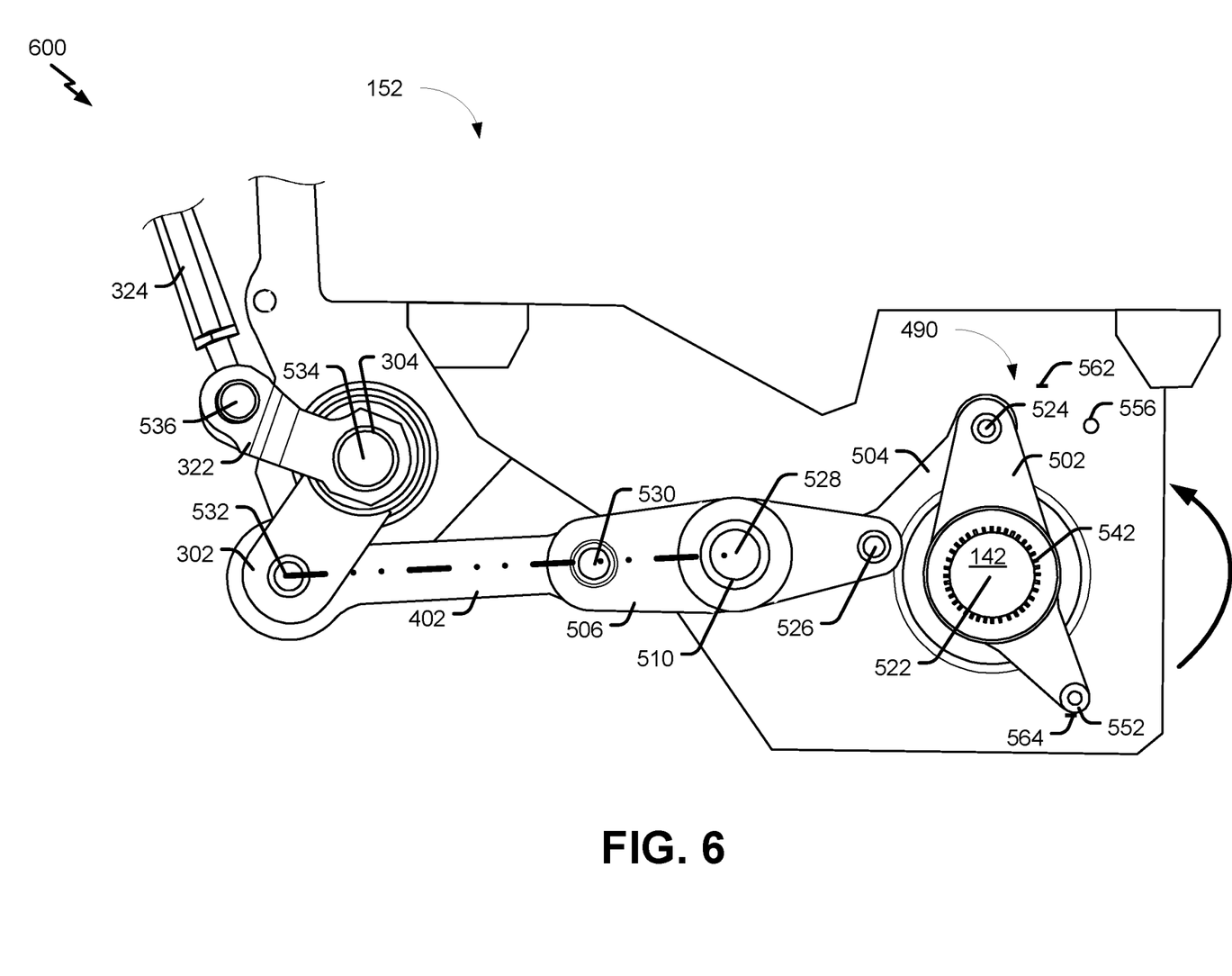
FIG. 6 is a diagram that illustrates a detailed side view of the example of the double on-center mechanical linkage, which is illustrated in the open state, of the system for operating the aerial refueling door.

The mechanical linkage 134 includes driving linkage 152. The mechanical linkage 134 is arranged or configured such that the mechanical linkage 134 has a "double on-center" configuration. Said another way, the mechanical linkage 134 has a first set (e.g., subset) of linkage that has an on-center orientation in a closed position (or state) and has a second set of linkage that has an on-center orientation/configuration in an open position, as illustrated in FIGS. 5 and 6. Two or more links with an on-center configuration will form or cause three or more pivot points associated with the two or more links to be aligned collinearly (or substantially aligned collinearly). Substantially aligned includes aligned within manufacturing tolerances or aligned within plus or minus 5 degrees. As an illustrative, non-limiting example, the on-center configuration may include two or more links with at least a portion of their centerlines aligned (or substantially aligned), such that three or more pivot points associated with the two or more links are aligned. In a particular implementation, one or more of the three pivot points is a fixed or bound pivot point, i.e., not capable of translation. In some implementations, the two or more links are aligned (or substantially aligned) in two axes, i.e., collinear with respect to two axes. To illustrate, the two or more links may be coupled by forked joints such that the three or more pivot points are collinear in a first axis and a second axis.

Having two or more links with an on-center configuration reduces or prevents loads (e.g., loads caused by drag, bird strike, boom strike, etc.) experienced by the door assembly 112 from being transferred to the actuator 132 (or an internal brake or teeth thereof). As an illustrative example, on-center links may prevent or reduce rotational forces on the driveshaft 142 of the actuator 132 being generated from loads experienced by the door assembly 112. Preventing or reducing the rotational forces on the driveshaft 142 decreases maintenance and increases maintenance intervals of the actuator 132, enables the actuator 132 to be smaller (reducing weight and size of the vehicle), and enables the actuator 132 to be an electric rotary motor and be placed in a pressurized portion of the vehicle (in compliance with civilian FAA certification).

The mechanical linkage 134 is coupled to the actuator 132 and to the door assembly 112. For example, the driving linkage 152 is coupled to the driveshaft 142 of the actuator 132 and to the door assembly 112. In some implementations, the mechanical linkage 134 includes door linkage 154, and the driving linkage 152 is coupled to the door assembly 112 via the door linkage 154. When the door assembly 112 includes the first door 122 and the second door 124, the door linkage 154 may include a single linkage chain or branch to open both of the first door 122 and the second door 124. Alternatively, the door linkage 154 includes multiple linkage chains or branches (e.g., first door linkage and second door linkage), such as a first set of links for the first door 122 and a second set of links for the second door 124, as described further with reference to FIGS. 3-6.

Figure 2:
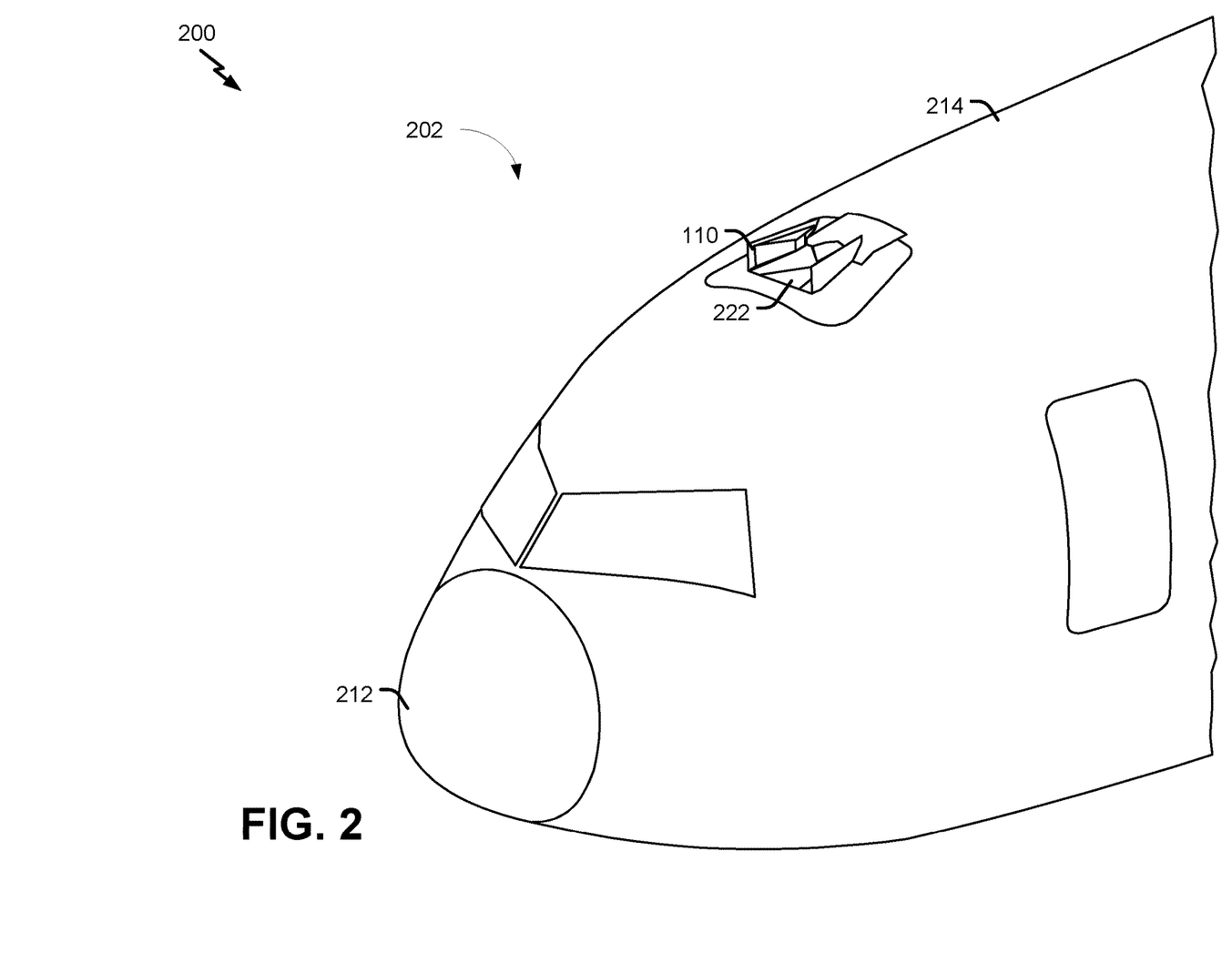
FIG. 2 is a diagram that illustrates an example of an aircraft including an aerial refueling door.

The aerial refueling system 102 further includes the fuel nozzle 162, a refueling boom 164, one or more fuel containers, and a controller 116. The fuel nozzle 162 is located within a compartment enclosed by the door assembly 112, as illustrated in FIG. 2, and is configured to receive fuel from another vehicle in-flight. The refueling boom 164 is configured to transfer fuel from the vehicle to one or more other vehicles in-flight.

The one or more fuel containers include one or more fuel storage tanks 166, one or more refueling tanks 168, one or more fuel tanks 170, or a combination thereof. The one or more fuel storage tanks 166 are configured to store fuel to be provided to other vehicles in-flight via the refueling boom 164. For example, the one or more fuel storage tanks 166 store fuel to be provided either directly to the refueling boom 164 or indirectly to the refueling boom 164 via the one or more refueling tanks 168. The one or more fuel storage tanks 166 are configured to receive fuel from the fuel nozzle 162, the refueling tanks 168, the fuel tanks 170, or a combination thereof, and to transfer fuel to the refueling tanks 168, to the fuel tanks 170, or a combination thereof. The one or more refueling tanks 168 are configured to provide fuel to other aircraft via the refueling boom 164. Alternatively, the one or more refueling tanks 168 are configured to provide fuel to other aircraft via another refueling device, such as a refueling drogue. In some such implementations, the one or more fuel storage tanks 166 provide fuel to the refueling boom 164.

The one or more fuel tanks 170 (e.g., operational fuel tanks) are configured to store fuel for use by the vehicle (e.g., fuel to be used by and provided to engines of the vehicle). In some implementations, the one or more fuel tanks 170 are in fluid connection with the fuel nozzle 162, the fuel storage tanks 166, the refueling tanks 168, or a combination thereof. In such implementations, the one or more fuel tanks 170 are configured to receive fuel (e.g., be refilled in-flight) via the fuel nozzle 162, the fuel storage tanks 166, the refueling tanks 168, or a combination thereof.

The controller 116 is configured to activate the actuator 132 and control a position or state of the door assembly 112. In some implementations, the controller 116 is further configured to control fuel transfer among the fuel containers and fuel delivery via the refueling boom 164. In other implementations, a separate controller(s) is/are configured to control fuel transfer among the fuel containers, fuel delivery via the refueling boom 164, or both. In some implementations, the controller 116 is configured to receive position information (or state information) from a sensor attached to the vehicle, the actuator 132, or to the mechanical linkage 134, such as a position indication switch or a limit switch. In such implementations, the controller 116 is configured to output or relay the position information to an operator of the aerial refueling system 102.

As illustrated in FIG. 1, the controller 116 is included in the aerial refueling system 102. In some implementations, the controller 116 is part of the aerial refueling door system 110, such as part of the door actuation system 114. As an illustrative, non-limiting example, the controller 116 may be integrated with the actuator 132. In other implementations, the controller 116 is separate from the aerial refueling system 102. For example, the controller 116 may include or correspond to a flight management computer (FMC) of the vehicle and is configured to communicate with the aerial refueling system 102.

In some implementations, the aerial refueling system 102 includes one or more fuel pumps 172 and one or more fuel lines 174. The one or more fuels pumps 172 are configured to move (e.g., pump) fuel from the one or more fuel containers to refueling boom 164 or between the one or more fuel containers via the one or more fuel lines 174. For example, the one or more fuel lines 174 may be in fluid connection with each of the one or more fuel containers and one "shared" set of fuel lines 174 (and valves thereof) connects each of the one or more fuel containers. To illustrate, the shared set of fuel lines 174 may transport fuel to by consumed by the vehicle engines (e.g., operational fuel) and fuel to be provided via the refueling boom 164 (e.g., refueling fuel). As another example, one or more of the fuel containers may be separate from one another and multiple distinct fuel lines 174 (e.g., closed fuel circuits) may connect subsets of the fuel containers. To illustrate, the vehicle may have separate fuel lines 174 for portions of the aircraft (e.g., left and right) or separate fuel lines 174 for operational fuel and refueling fuel.

During operation of the vehicle, such as the aircraft 202 of FIG. 2, the door assembly 112 of the vehicle is typically closed (i.e., in the closed state or position) for aerodynamic performance and to protect the fuel nozzle 162. Responsive to a command (e.g., a door open command) to initiate aerial refueling, the controller 116 activates the actuator 132. The actuator 132 rotates the driveshaft 142 in a first direction (e.g., clockwise) to drive and move the mechanical linkage 134 such that the mechanical linkage 134 opens the door assembly 112. For example, the driving linkage 152 is driven from a first on-center configuration to a second on-center configuration. Driving the driving linkage 152 opens the first door 122 and the second door 124 via the door linkage 154.

While the first door 122 and the second door 124 are in the open state, the aerial refueling system 102 receives fuel from another vehicle (e.g., another aircraft) in-flight via the fuel nozzle 162. In some implementations, the vehicle uses the received fuel to refill the fuel tanks 170. Additionally or alternatively, the vehicle uses the received fuel to refuel other vehicles via the refueling boom 164.

Responsive to a second command to end aerial refueling (e.g., a close door command), the controller 116 activates the actuator 132. The actuator 132 rotates the driveshaft 142 in a second direction (e.g., counter-clockwise) to drive and move the mechanical linkage 134 such that the mechanical linkage 134 closes the door assembly 112. For example, the driving linkage 152 is driven from the second on-center configuration to the first on-center configuration. Driving the driving linkage 152 closes the first door 122 and the second door 124 via the door linkage 154 (e.g., transitions the door assembly 112 from the open state to the closed state).

In the event of a power loss or a component malfunction (e.g., the actuator 132 loses power), the door assembly 112 remains in (or maintains) its current state. For example, the first door 122 and the second door 124 remain in the open position if the actuator 132 loses power while the first door 122 and the second door 124 are in the open position. As another example, the first door 122 and the second door 124 remain in the closed position if the actuator 132 loses power while the first door 122 and the second door 124 are in the closed position. The double on-center configuration aligns the driving linkage 152 to reduce or prevent a moment arm, which prevents the door assembly 112 from changing states or positions, as described further with reference to FIGS. 5 and 6. As an example, the driving linkage 152 reduces or prevents loads received by the door assembly 112 from causing rotation of the driveshaft 142 of the actuator 132 and deterioration of the driveshaft 142 (e.g., teeth thereof). Instead, loads received by the door assembly 112 exert linear force on support structure or the driveshaft 142, which can be absorbed without damaging the actuator 132.

In some implementations, the aerial refueling system 102 includes a refueling drogue. For example, the refueling drogue may replace the refueling boom 164 and is configured to deliver fuel to a refueling probe of another vehicle. As another example, the aerial refueling system 102 includes one or more refueling drogues in addition to the refueling boom 164. The refueling drogues may receive fuel from the same fuel container as the refueling boom 164 or from a different fuel container than the refueling boom 164.

The aerial refueling system 102 provides in-flight refueling of the vehicle via the aerial refueling door system 110 and fuel nozzle 162 and provides refueling of other vehicles via the refueling boom 164. By utilizing the mechanical linkage 134 having a double on-center configuration, the aerial refueling door system 110 is less complex and may be used with electric actuators. By being less complex and using electric actuators, the aerial refueling door system 110 has reduced costs and reduced maintenance as compared to aerial refueling door systems with conventional linkages, hydraulic motors, or a combination thereof.

As compared to aircraft with aerial refueling door systems that have conventional linkage, the mechanical linkage 134 of the aerial refueling door system 110 provides a locking feature (in the open or closed position or state) in the event of a power loss (or pressure loss) and can provide high load capability (withstands large impact loads). Additionally, the mechanical linkage 134 provides a load path to structure, instead of the actuator 132, which protects the actuator 132 and enables the aerial refueling system 102 to use smaller actuators or electric motors. Furthermore, the mechanical linkage 134 provides increased mechanical advantage to enable the aerial refueling door system 110 to generate sufficient opening force from smaller and less powerful actuators, such as an electric motor or a smaller hydraulic motor.

FIG. 2 illustrates a diagram 200 depicting an example configuration and placement of the aerial refueling door system 110 of FIG. 1 on an aircraft 202. As illustrated in FIG. 2, the aircraft 202 corresponds to a civilian airplane. In other implementations, the aerial refueling system 102 may be included in or on another type of aircraft 202, such as a military airplane, a tanker, a helicopter, a tilt rotor aircraft, a drone, etc.

In FIG. 2, the aerial refueling door system 110 includes the first door 122 and the second door 124 of FIG. 1. FIG. 2 depicts the aerial refueling door system 110 positioned in proximity to a nose 212 of the aircraft 202 and on an upper portion 214 or surface of the aircraft 202. In the example depicted in FIG. 2, the first and second doors 122, 124 of the door assembly 112 correspond to curved and angled doors that swing outwards, i.e., away from the aircraft 202 to expose a compartment 222 that houses the fuel nozzle 162 of FIG. 1. The configuration and placement of the aerial refueling door system 110 shown in FIG. 2 enables the aircraft 202 to open the door assembly 112 to receive fuel in-flight from another vehicle via the fuel nozzle 162 and to close the door assembly 112 during operation (e.g., when not performing a refueling operation) to protect the fuel nozzle 162.

In some implementations, the compartment 222 is not pressurized. In such implementations, the compartment 222 is exposed to ambient pressures (e.g., environmental or external pressure) and is not within a pressurized portion of the aircraft 202. In some such implementations, the actuator 132 of FIG. 1 is located within the pressurized portion of the aircraft 202.

Figure 3:
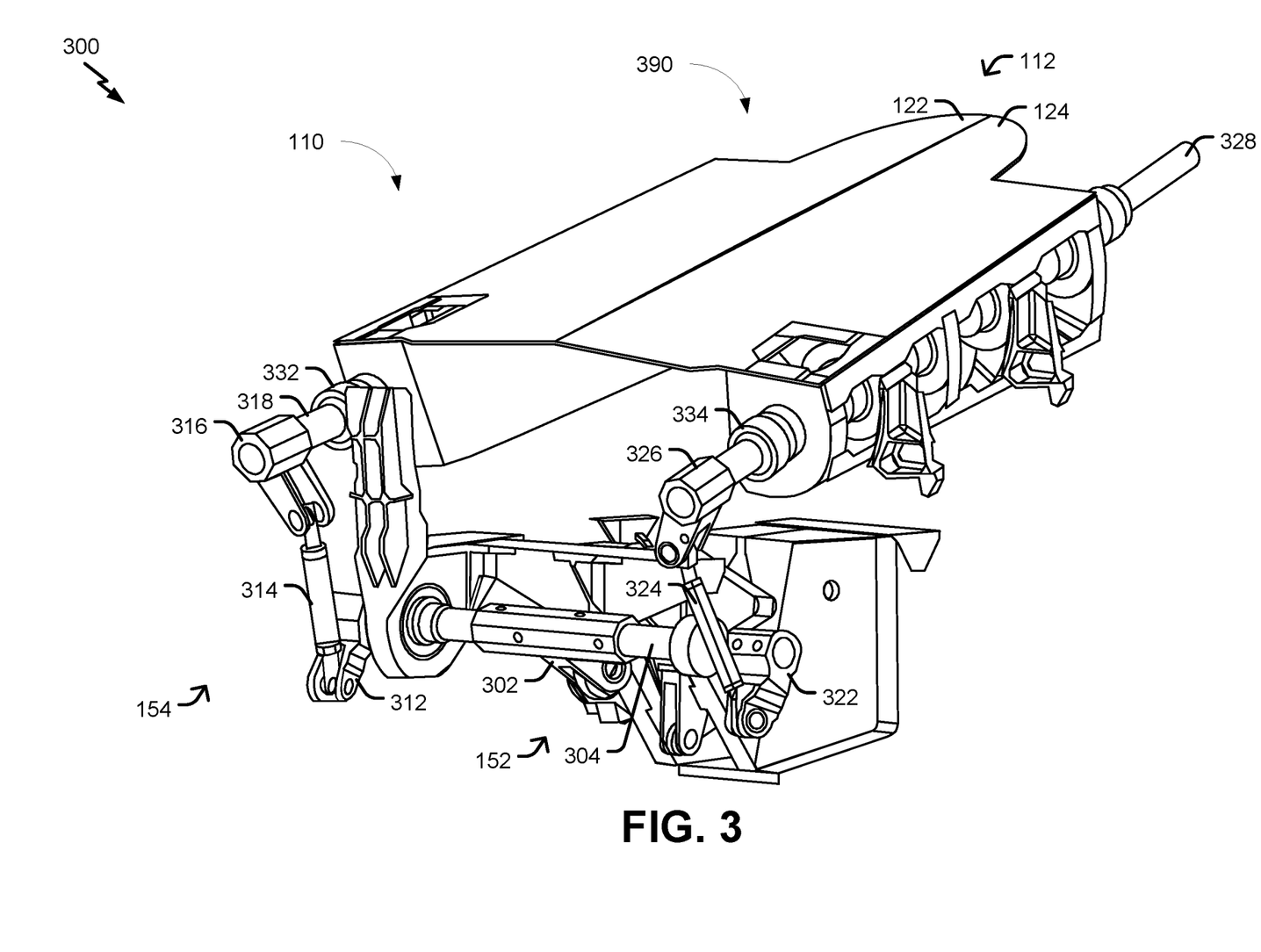
FIG. 3 is a diagram that illustrates an isometric view of an example of a system for operating an aerial refueling door, which is illustrated in a closed state.

FIG. 3 is a diagram that illustrates an isometric view 300 of an example of the aerial refueling door system 110 in a closed position 390. As illustrated in FIG. 3, the aerial refueling door system 110 includes the door assembly 112 and the door actuation system 114 of FIG. 1.

The door actuation system 114 includes the actuator 132 (not shown in FIG. 3) and the mechanical linkage 134. As illustrated in FIG. 3, the mechanical linkage 134 includes the driving linkage 152 (partially illustrated in FIG. 3) and the door linkage 154. The driving linkage 152 includes a drive link 502 (shown in FIGS. 5 and 6), a first link 504 (shown in FIGS. 5 and 6), a second link 506 (shown in FIGS. 5 and 6), a third link 402 (shown in FIGS. 4-6), and a fourth link 302 (shown in FIGS. 3-6).

As illustrated in FIG. 3, the door linkage 154 includes first door linkage configured to open and close the first door 122 and second door linkage configured to open and close the second door 124. The first door linkage is coupled to the fourth link 302 of the mechanical linkage 134 via a torque transfer shaft 304 and is coupled to the first door 122. The first door linkage is configured to open and close the first door 122 responsive to rotation of the torque transfer shaft 304. The first door linkage includes a first input link 312, a first coupler link 314, a first output link 316, and a first output shaft 318.

As illustrated in FIG. 3, the first input link 312 is rotatably coupled to the torque transfer shaft 304. The first coupler link 314 is rotatably coupled to the first input link 312. The first output link 316 is rotatably coupled to the first coupler link 314 and is coupled to the first door 122 via the first output shaft 318. The links or members of the door linkage 154 may be coupled together by fasteners, such as pins or shoulder bolts, as illustrative, non-limiting examples.

The second door linkage is coupled to the fourth link 302 of the mechanical linkage 134 via the torque transfer shaft 304 and is coupled to the second door 124. The second door linkage is configured to open and close the second door 124 responsive to rotation of the torque transfer shaft 304. The second door linkage includes a second input link 322, a second coupler link 324, a second output link 326, and a second output shaft 328.

As illustrated in FIG. 3, the second input link 322 is rotatably coupled to the torque transfer shaft 304. The second coupler link 324 is rotatably coupled to the second input link 322. The second output link 326 is rotatably coupled to the second coupler link 324 and is coupled to the second door 124 via the second output shaft 328.

In some implementations, the output shafts 318, 328 include bearings. As illustrated in FIG. 3, the first output shaft 318 includes a first bearing 332 and the second output shaft 328 includes a second bearing 334. The bearings 332, 334 are configured to reduce friction and enable rotation of the output shafts 318, 328 and opening and closing the first and second doors 122, 124.

In a particular example, the door linkage 154 may include or correspond to two four-bar linkages (e.g., the first door linkage and the second door linkage). To illustrate, the first input link 312, the first coupler link 314, the first output link 316, and a frame (e.g., the aircraft 202, referred to as a "ground" link) correspond to a first four-bar linkage to drive the first door 122. The second input link 322, the second coupler link 324, the second output link 326, and the frame correspond to a second four-bar linkage to drive the second door 124. In such implementations, the coupler links 314, 324 may correspond to floating links, and the input links 312, 322 and the output links 316, 326 may correspond to grounded links.

Each four-bar linkage may be associated with four rotatable joints. To illustrate, the first four-bar linkage corresponds to rotatable joints formed by the torque transfer shaft 304 and the first input link 312, the first input link 312 and the first coupler link 314, the first coupler link 314 and the first output link 316, and the first output link 316 and the first output shaft 318. The second four-bar linkage corresponds to rotatable joints formed by the torque transfer shaft 304 and the second input link 322, the second input link 322 and the second coupler link 324, the second coupler link 324 and the second output link 326, and the second output link 326 and the second output shaft 328. Operation of the aerial refueling door system 110 is described with reference to FIG. 4.

Figure 4:
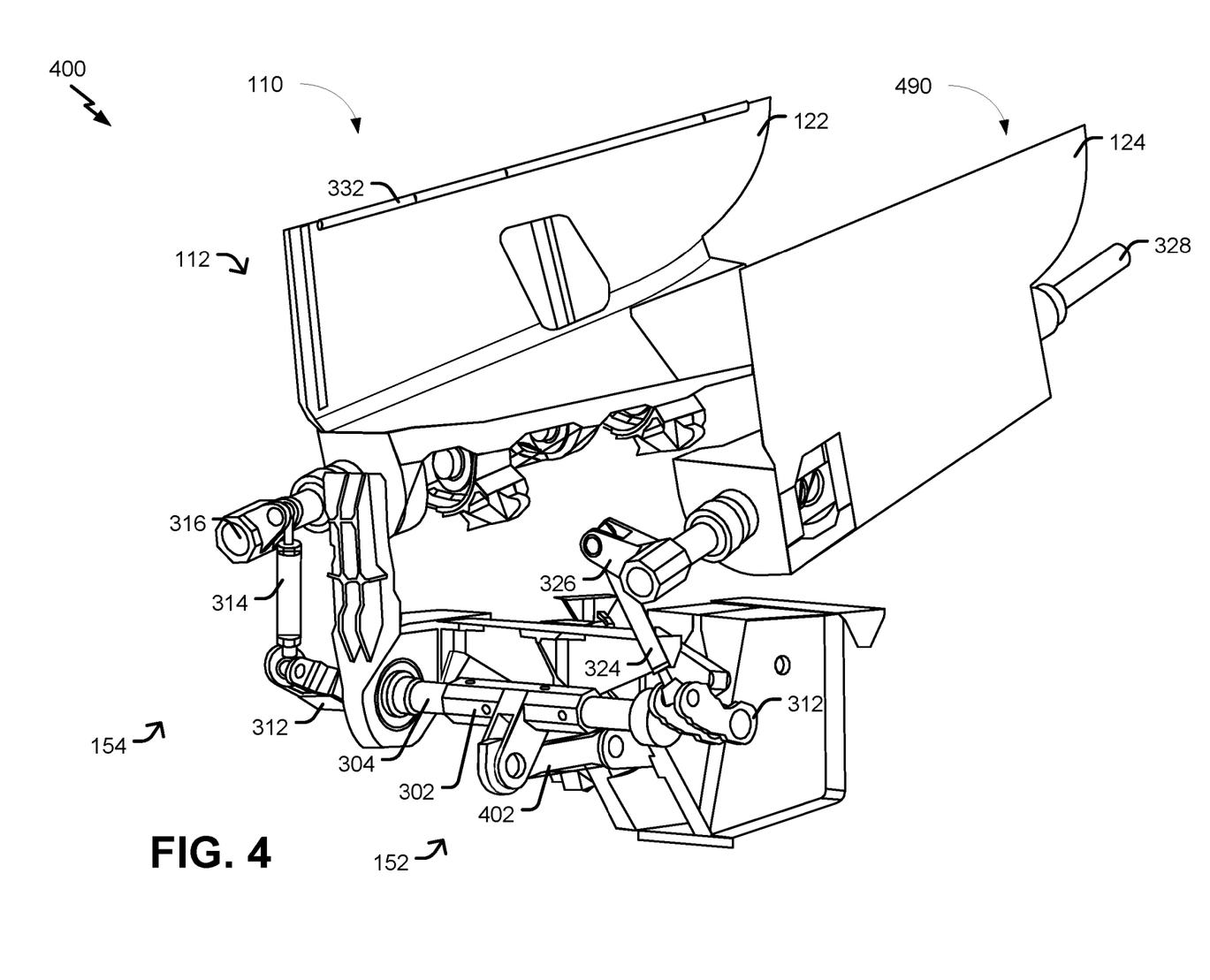
FIG. 4 is a diagram that illustrates an isometric view of the example of the system for operating the aerial refueling door, which is illustrated in an open state.

FIG. 4 is a diagram that illustrates another isometric view 400 of the example of the aerial refueling door system 110 shown in FIG. 3 in an open position 490. As illustrated in FIG. 4, the torque transfer shaft 304 is rotated relative to its position in FIG. 3 to open the door assembly 112. The door assembly 112 opens by the first door 122 and the second door 124 swinging outwards (e.g., away from the vehicle).

FIG. 4 illustrates the third link 402 of the driving linkage 152 rotatably coupled to the fourth link 302. The third link 402 is also coupled to the actuator 132 (not shown in FIG. 4) via the rest of the driving linkage 152 (as illustrated in FIGS. 5 and 6).

Responsive to an activation signal (e.g., a door open command), the actuator 132 rotates and causes the fourth link 302 to be rotated by movement and rotation of the third link 402. Rotation of the fourth link 302 rotates the torque transfer shaft 304. Rotation of the torque transfer shaft 304 rotates and drives the first door linkage and the second door linkage of the door linkage 154. To illustrate, the first input link 312 and the second input link 322 rotate and drive the first coupler link 314 and the second coupler link 324 upwards as illustrated in FIGS. 3 and 4. The upwards movement of the first coupler link 314 and the second coupler link 324 rotates the first output link 316 and the second output link 326. Rotation of the output links 316, 326 rotates the output shafts 318, 328 to open the first and second doors 122, 124 (e.g., transition the door assembly 112 to the open position 490).

Responsive to a second activation signal (e.g., a door close command), the actuator 132 rotates and causes the fourth link 302 to be rotated (in the opposite direction) by movement and rotation of the third link 402. Rotation of the fourth link 302 rotates the torque transfer shaft 304. Rotation of the torque transfer shaft 304 rotates and drives the first door linkage and the second door linkage of the door linkage 154. To illustrate, the first input link 312 and the second input link 322 rotate and drive the first coupler link 314 and the second coupler link 324 downwards as illustrated in FIGS. 3 and 4. The downwards movement of the first coupler link 314 and the second coupler link 324 rotates the first output link 316 and the second output link 326. Rotation of the output links 316, 326 rotates the output shafts 318, 328 to close the first and second doors 122, 124 (e.g., transition the door assembly 112 to the closed position 390).

FIGS. 5 and 6 illustrate detailed side views of an example of the driving linkage 152 of FIG. 1. FIG. 5 is a diagram 500 that illustrates the driving linkage 152 of the example aerial refueling door system 110 illustrated in FIGS. 3 and 4 in the closed position 390. The driving linkage 152 includes a support shaft 510 and one or more members (e.g., links) configured to drive the door assembly 112 (not shown in FIG. 5) via the second input link 322 and the second coupler link 324 of the door linkage 154.

As illustrated in FIG. 5, the driving linkage 152 includes the drive link 502, the first link 504, the second link 506, the third link 402, and the fourth link 302. The drive link 502 is mechanically coupled to the actuator 132. For example, the drive link 502 is rotatably coupled to the driveshaft 142 of the actuator 132 via teeth 542, forming a drive pivot point 522 (e.g., a rotatable joint or a revolute joint). In some implementations, the drive link 502 includes a shaft, as illustrated in FIG. 5. In a particular implementation, the shaft is supported by bearings (not shown) at both ends and the shaft coupled to the driveshaft 142 via a spline (not shown) of the driveshaft 142.

The first link 504 is coupled (e.g., rotatably coupled) to the drive link 502 via a pin forming a first pivot point 524. The drive pivot point 522 is fixed and the first pivot point 524 is movable/drivable (e.g., capable of translation). The second link 506 is coupled (e.g., rotatably coupled) to the first link 504 via a pin forming a second pivot point 526 and is coupled to a support shaft 510. The second link 506 is configured to rotate about the support shaft 510 (e.g., a fixed or bound pivot point 528). The third link 402 is coupled (e.g., rotatably coupled) to the second link 506 via a pin forming a third pivot point 530.

The fourth link 302 is coupled (e.g., rotatably coupled) to the third link 402 via a pin forming a fourth pivot point 532 and is mechanically coupled to the door assembly 112 (not shown in FIG. 4). For example, the fourth link 302 is coupled to the torque transfer shaft 304 forming a fifth pivot point 534. The fourth link 302 is coupled to the door assembly 112 via the torque transfer shaft 304 and the door linkage 154 (e.g., second input link 322 and second coupler link 324 as illustrated in FIG. 5).

When the door assembly 112 is in a closed position 390, the driveshaft 142 (e.g., a center of the driveshaft 142 or the drive pivot point 522), the first pivot point 524, and the second pivot point 526 are aligned (e.g., substantially aligned). In the example illustrated in FIG. 5, when the door assembly 112 is in the closed position 390, centerlines of the drive link 502 (e.g., at least a portion of the drive link 502) and the first link 504 are aligned, i.e., on-center. In a particular implementation, the driveshaft 142 (e.g., a center of the driveshaft 142 or the drive pivot point 522), the first pivot point 524, and the second pivot point 526 are collinear with respect to two axes. For example, the driveshaft 142 (e.g., a center of the driveshaft 142 or the drive pivot point 522), the first pivot point 524, and the second pivot point 526 are also collinear with respect to a particular axis that is oriented into and out of the page.

The first pivot point 524, the second pivot point 526, the third pivot point 530, and the fourth pivot point 532 are moveable pivot points (e.g., non-fixed pivot points capable of translation). The first pivot point 524, the second pivot point 526, the third pivot point 530, and the fourth pivot point 532 are driven, as opposed to moving by sliding like prismatic joints or cylindrical joints. The drive pivot point 522, the bound pivot point 528, and the fifth pivot point 534 are fixed pivot points (e.g., not capable of translation).

When the driving linkage 152 is in the closed position 390, loads experienced by the door assembly 112 (not shown in FIG. 5) generate compressive forces on the driveshaft 142 and radially forces on the drive link 502. The radial forces may be supported by the shaft and bearings of the drive link 502, as opposed to driveshaft 142, when the drive link 502 and the first link 504 are on-center. If the drive link 502 and the first link 504 are off-center, loads experienced by the door assembly 112 will generate (transfer) torque to the driveshaft 142, i.e. back driving the actuator 132. Back driving the actuator 132 can damage the actuator 132. When the drive link 502 and the first link 504 are on-center, the loads experienced by the door assembly 112 do not generate rotational forces or generate reduced rotational forces which do not degrade the teeth 542 of the actuator 132. To illustrate, wind loads that tend to open the door assembly 112 would result in the second link 506 attempting to rotate counter-clockwise and push or press the first link 504 into the drive link 502 and the driveshaft 142. Because the driveshaft 142 (e.g., a center of the driveshaft 142 or the drive pivot point 522), the first pivot point 524, and the second pivot point 526 are collinear, the attempted rotation of the second link 506 does not generate a moment (or generates a small moment that does not degrade the teeth 542). Accordingly, the compressive forces are absorbed by the driveshaft 142 and the teeth 542 and the actuator 132 are protected, without using a large internal brake to prevent back driving.

In some implementations, the aerial refueling door system 110 includes a door rigging pin hole 552. The door rigging pin hole 552 includes a hole that is configured to align with a second hole 554 in structure (e.g., a frame), when the door assembly 112 is in the closed position 390, and to align with a third hole 556 (shown in FIG. 6) in a second structure (or the structure), when the door assembly 112 is in the open position 490. The hole is configured to receive a rigging pin or shaft which can be used to keep the door assembly 112 in the closed position 390 (when the rigging pin is also inserted into the second hole 554) or in the open position 490 (when the rigging pin is also inserted into the third hole 556).

In some implementations, the aerial refueling door system 110 includes one or more sensors. The one or more sensors are configured to determine a position or state of the door assembly 112, such as the closed position 390, the open position 490, or one or more positions between the closed position 390 and the open position 490, or a combination thereof. The one or more sensors may be coupled to the actuator 132, the mechanical linkage 134, or the door assembly 112. As an illustrative, non-limiting example, the one or more sensors include a door position indication switch(es). In a particular illustrative example, a first door position indication switch is coupled proximate to the first output shaft 318 and a second door position switch is coupled to proximate to the second output shaft 328. The door position indication switches are configured to sense contact by a cam coupled to the shafts 318, 328, such as near a particular end of the shafts 318, 328, and to determine a position of each door 122, 124. A controller, such as the controller 116 of FIG. 1, determines the position or state of the door assembly 112 based on the position(s) of the doors 122, 124. In some implementations, multiple sensors can be used to determine a position or state of one or more components of the aerial refueling door system 110. For example, the aerial refueling door system 110 can include two sensors (e.g., contact sensors) positioned at the ends of a length of travel of a particular link to detect when the particular link is at each of the ends of the length of travel.

In a particular implementation, the one or more sensors includes sensors for activating and/or deactivating the actuator 132. For example, the door position switches can be used to deactivate the actuator 132. As another example, dedicated limit switches are used to deactivate the actuator 132. As an illustrative, non-limiting example of using dedicated limit switches for actuator control, the one or more sensors include limit switches 562, 564 that are activated by contact with a particular link (or a cam thereof) of the mechanical linkage 134. For example, the limit switches 562, 564 are coupled to the structure and are configured to stop the actuator 132 when the actuator 132 (and the door assembly 112) reaches the closed position 390 and the open position 490 shown in FIGS. 5 and 6. The drive link 502 (or a cam thereof) contacts the limit switches 562, 564 at the ends of a length of travel of the drive link 502. Upon contact by the drive link 502, a first limit switch 562 sends a signal configured to stop the actuator 132 to the actuator 132 (or a controller thereof, such as the controller 116 of FIG. 1). The limit switches 562, 564 are configured to stop the actuator 132 when the drive link 502 is in the closed and open positions 390, 490.

During operation of a vehicle, such as the aircraft 202, the aerial refueling door system 110 receives or generates an activation signal (e.g., a door open signal or command). Responsive to the activation signal, the controller 116 activates the actuator 132 to rotate the driveshaft 142. As illustrated in FIG. 5, clockwise rotation of the driveshaft 142 opens the door assembly 112. To illustrate, clockwise rotation of the driveshaft 142 rotates the drive link 502 clockwise. Rotation of the drive link 502 drives the first pivot point 524 rightwards and upwards as illustrated in FIG. 5. Rotating and driving the first link 504 rotates the second link 506, the second pivot point 526, and the third pivot point 530 about the support shaft 510 (and the bound pivot point 528) in a counter-clockwise direction.

Rotation of the second link 506 and the third pivot point 530 rotates and drives the third link 402 and the fourth pivot point 532 leftwards and downwards as illustrated in FIG. 5. Rotation of the second link 506 also aligns the second link 506 and the third link 402 into an on-center configuration as illustrated in FIG. 6. Rotating and driving the third link 402 and the fourth pivot point 532 rotates the fourth link 302 about the fifth pivot point 534 in a clockwise direction. Rotating the fourth link 302 about the fifth pivot point 534 causes the torque transfer shaft 304 and the second input link 322 to rotate in a clockwise direction. Rotation of the second input link 322 (about the fifth pivot point 534 as illustrated in FIG. 5) rotates and drives the second coupler link 324 and a sixth pivot point 536, formed by the second input link 322 and the second coupler link 324, leftwards and upwards as illustrated in FIG. 5.

The driving linkage 152 may include or correspond to two four-bar linkages. To illustrate, the drive link 502, the first link 504, the second link 506 (e.g., a portion thereof), and a frame (e.g., the aircraft 202, referred to as a "ground" link)

correspond to a first four-bar linkage to drive the torque transfer shaft 304 via a second-four bar linkage. The second link 506, the third link 402, the fourth link 302, and the frame correspond to a second four-bar linkage to drive the torque transfer shaft 304 (and the door assembly 112, not shown in FIG. 6). In such implementations, the first link 504 and the third link 402 may correspond to floating links, and the drive link 502, the second link 506, and the fourth link 302 may correspond to grounded links (e.g., have bound pivot points).

Each four-bar linkage may be associated with four rotatable joints. To illustrate, the first four-bar linkage corresponds to the rotatable joints associated with pivot points 522, 524, 526, and 528, and the second four-bar linkage corresponds to the rotatable joints associated with pivot points 528, 530, 532, and 534. The links or members of the driving linkage 152 may be coupled together by fasteners, such as pins or shoulder bolts, as illustrative, non-limiting examples, to form the rotatable joints (e.g., revolute joints).

In some implementations, the first link 504, the second link 506, the third link 402, and the fourth link 302 are substantially straight and move substantially in plane. For example, the first link 504, the second link 506, the third link 402, and the fourth link 302 are located in the same plane (e.g., coplanar) and move (e.g., linear movement, rotational movement, or both) within in the same plane. In such implementations, joints between the first link 504, the second link 506, the third link 402, and the fourth link 302 include or correspond to knuckle joints (e.g., a forked end of a first particular link is coupled to a straight end of a second particular link). In other implementations, the first link 504, the second link 506, the third link 402, and the fourth link 302 are substantially straight and one or more links are offset from at least one other link.

FIG. 6 is a diagram 600 that illustrates another detailed view of the example of the driving linkage 152 shown in FIG. 5 in the open position 490. As illustrated in FIG. 6, when the door assembly 112 is in the open position 490, the support shaft 510 (e.g., the bound pivot point 528), the third pivot point 530, and the fourth pivot point 532 are aligned (e.g., substantially aligned). As illustrated in FIG. 6, when the door assembly 112 is in the open position 490, centerlines of the second link 506 (e.g., at least a portion of the second link 506) and the third link 402 are aligned, i.e., on-center. Additionally, the second pivot point 526 is aligned with the bound pivot point 528, the third pivot point 530, and the fourth pivot point 532 (e.g., a centerline of the entire second link 506 is aligned with a centerline of the third link 402).

During operation, counter-clockwise rotation of the driveshaft 142 closes the door assembly. To illustrate, counter-clockwise rotation of the driveshaft 142 rotates the drive link 502 counter-clockwise. Rotation of the drive link 502 drives the first pivot point 524 leftwards and downwards as illustrated in FIG. 6. Rotation of the drive link 502 also rotates and drives the first link 504 to align the drive link 502 and the first link 504 into an on-center configuration as illustrated in FIG. 5. Rotating and driving the first link 504 rotates the second link 506, the second pivot point 526, and the third pivot point 530 about the support shaft 510 (and the bound pivot point 528) in a clockwise direction. Rotation of the second link 506 and the third pivot point 530 rotates and drives the third link 402 and the fourth pivot point 532 leftwards and upwards as illustrated in FIG. 6. Rotating and driving the third link 402 and the fourth pivot point 532 rotates the fourth link 302 about the fifth pivot point 534 in a counter-clockwise direction. Rotating the fourth link 302 about the fifth pivot point 534 causes the torque transfer shaft 304 and the second input link 322 to rotate in a counter-clockwise direction. Rotation of the second input link 322 (about the fifth pivot point 534 as illustrated in FIG. 6) rotates and drives the second coupler link 324 and the sixth pivot point 536 rightwards and downwards as illustrated in FIG. 6.

When the driving linkage 152 is in the open position 490, loads experienced by the door assembly 112 (not shown in FIG. 6) generate compressive forces on the support shaft 510. The loads experienced by the door assembly 112 do not generate rotational forces or generate reduced rotational forces which can be absorbed by a smaller internal brake and which do not degrade the teeth 542 of the actuator 132. To illustrate, wind loads that tend to close the door assembly 112 would result in the fourth link 302 attempting to rotate counter-clockwise and push or press the third link 402 into the second link 506 and the support shaft 510. Because the bound pivot point 528, the third pivot point 530, and the fourth pivot point 532 are collinear, the attempted rotation of the fourth link 302 does not generate a moment on the second link 506, which does not generate a moment on the driveshaft 142. Accordingly, the support shaft 510 absorbs the compressive forces, rather than the internal brake of the actuator 132, and the teeth 542 are protected. Additionally, the compressive forces on the support shaft 510 do not generate rotational or compressive forces that would degrade the internal brake or the teeth 542.

In other implementations, other linkages may be used, such as five-bar linkages, six-bar linkages, 8-bar linkages, etc. Although the door assembly 112 is illustrated as including two doors in FIG. 3, the door assembly 112 may include more than the two doors or fewer than two doors. In such implementations where the door assembly 112 includes a single door, the driving linkage 152 may be directly connected to the single door. To illustrate, the fourth link 302 may be coupled to the single door of the door assembly 112 directly or via an output shaft. Although various linkages (members) have been described, the mechanical linkage 134 may include one or more gears.

As compared to aerial refueling door system that use hydraulic motors, the aerial refueling door system 110 reduces a size and weight of the aerial refueling door system 110 and the aircraft 202. Additionally, as compared to aerial refueling door systems that include conventional linkage (e.g., a single four-bar linkage), the aerial refueling door system 110 (and mechanical linkage 134 thereof) enables a smaller and lighter actuator (e.g., an electric motor) to be used to satisfy operational constraints. For example, the double on-center configuration of the mechanical linkage 134 protects the electric motor from loads and generates sufficient torque to open the door assembly 112 when the door assembly 112 is iced over and to close the door assembly 112 in-flight with less torque/power input. Furthermore, use of the aerial refueling door system 110 (and electric motor) enables the aircraft 202 to be certified as a civilian aircraft (or forgo recertification under a military certification).

Figure 7:
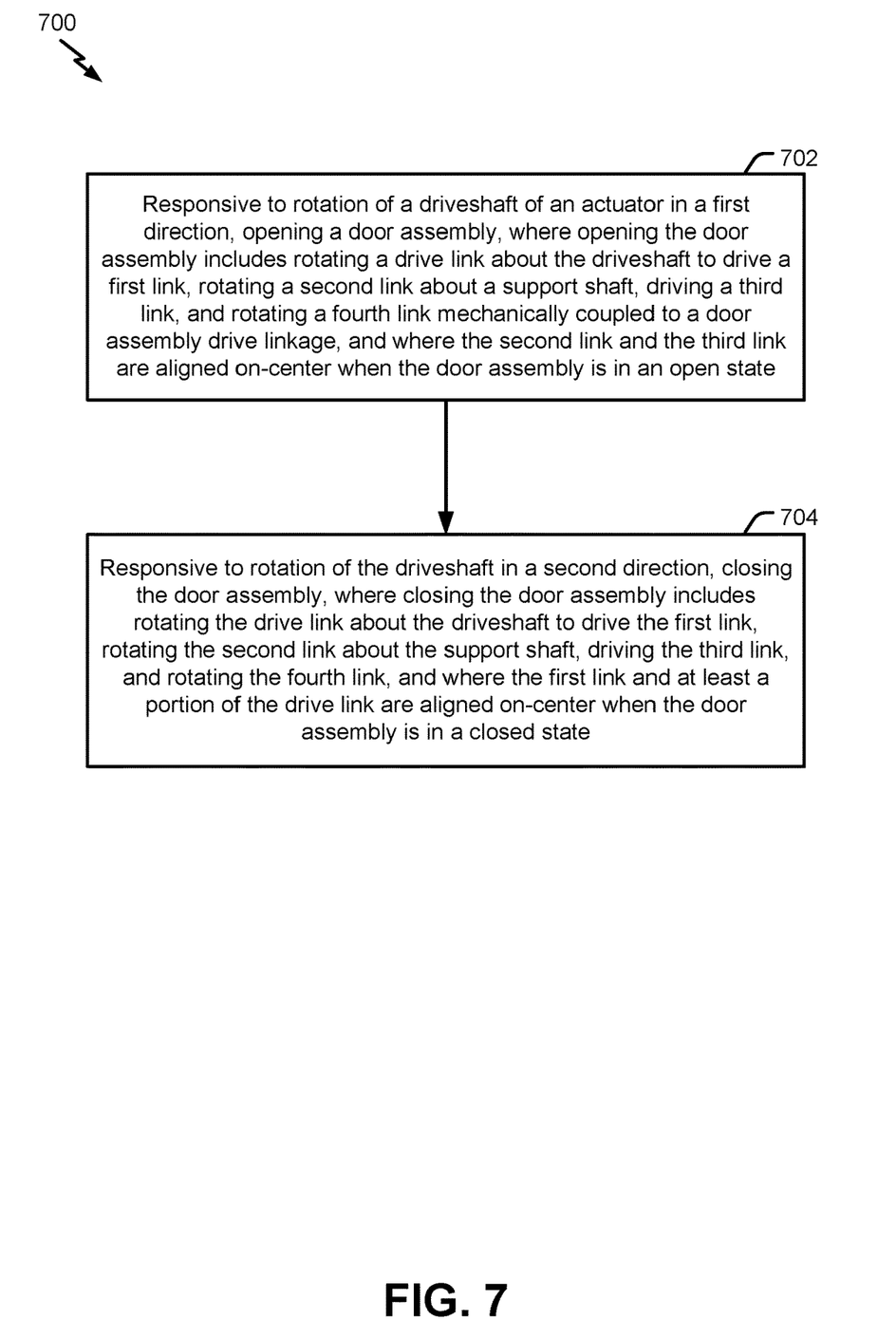
FIG. 7 is a flow chart of an example of a method of operating an aerial refueling door.

FIG. 7 illustrates a method 700 of operating an aerial refueling system, such as the aerial refueling system 102 of FIG. 1. The method 700 may be performed by the aerial refueling system 102, the aerial refueling door system 110, the door actuation system 114, the actuator 132, the mechanical linkage 134, the driving linkage 152, the controller 116 of FIG. 1, the aircraft 202 of FIG. 1, or a combination thereof. The method 700 includes, at 702, responsive to rotation of a driveshaft of an actuator in a first direction, opening a door assembly. Opening the door assembly includes rotating a drive link about the driveshaft to drive a first link, rotating a second link about a support shaft, driving a third link, and rotating a fourth link mechanically coupled to a door assembly drive linkage, such that the second link and the third link are aligned on-center when the door assembly is in an open state.

In a particular example, the actuator includes or corresponds to the actuator 132, and the driveshaft includes or corresponds to the driveshaft 142 of FIG. 1. In this example, the door assembly includes or corresponds to the door assembly 112 of FIG. 1. Additionally, the drive link, the first link, the second link, the third link, and the fourth link include or correspond to the mechanical linkage 134 or the driving linkage 152 of FIG. 1. In some implementations, the drive link, the first link, the second link, the third link, and the fourth link include or correspond the drive link 502, the first link 504, the second link 506, the third link 402, and the fourth link 302 of FIGS. 3-6, respectively. The open state includes or corresponds to the open position 490 of FIGS. 4 and 6. To illustrate, rotation (e.g., clockwise rotation) of the driveshaft 142 of the actuator 132 moves (e.g., drives and rotates) the driving linkage 152 (e.g., the drive link 502, the first link 504, the second link 506, the third link 402, and the fourth link 302) from the closed position 390 to the open position 490, as described with reference to FIGS. 1, 4, and 6.

The method 700 of FIG. 7 further includes, at 704, responsive to rotation of the driveshaft in a second direction, closing the door assembly. Closing the door assembly includes rotating the drive link about the driveshaft to drive the first link, rotating the second link about the support shaft, driving the third link, and rotating the fourth link, such that the first link and at least a portion of the drive link are aligned on-center when the door assembly is in a closed state. To illustrate, rotation (e.g., counter clockwise rotation) of the driveshaft 142 of the actuator 132 moves (e.g., drives and rotates) the driving linkage 152 (e.g., the drive link 502, the first link 504, the second link 506, the third link 402, and the fourth link 302) from the open position 490 to the closed position 390, as described with reference to FIGS. 1 and 5.

In some implementations, the door assembly is located on an aircraft and is opened during flight, as described with reference to FIG. 2. Additionally, when the door assembly is in the open state, the door assembly enables access to a fuel intake nozzle, as described with reference to FIG. 2. In such implementations, the method 700 further includes, prior to closing the door assembly, receiving fuel from another aircraft via the fuel intake nozzle. For example, while the door assembly 112 is open, the aircraft 202 receives fuel from another aircraft via the fuel nozzle 162, as described with reference to FIG. 1.

In some implementations, the method 700 further includes transferring the received fuel to an operational fuel tank, a refueling tank, or a fuel storage tank. For example, the aerial refueling system 102 of the aircraft 202 transfers fuel to one or more of the fuel containers. To illustrate, the one or more fuel pumps 172, the one or more fuel lines, or a combination thereof, may transport the fuel received from the other aircraft via the nozzle to the one or more fuel storage tanks 166, the one or more refueling tanks 168, the one or more fuel tanks 170, or a combination thereof.

In some implementations, the method 700 further includes transferring the received fuel to a third aircraft via a refueling boom. For example, the refueling boom 164 transfers at least a portion of the fuel received via the fuel nozzle 162 (from a second aircraft) to a third aircraft.

Figure 8:
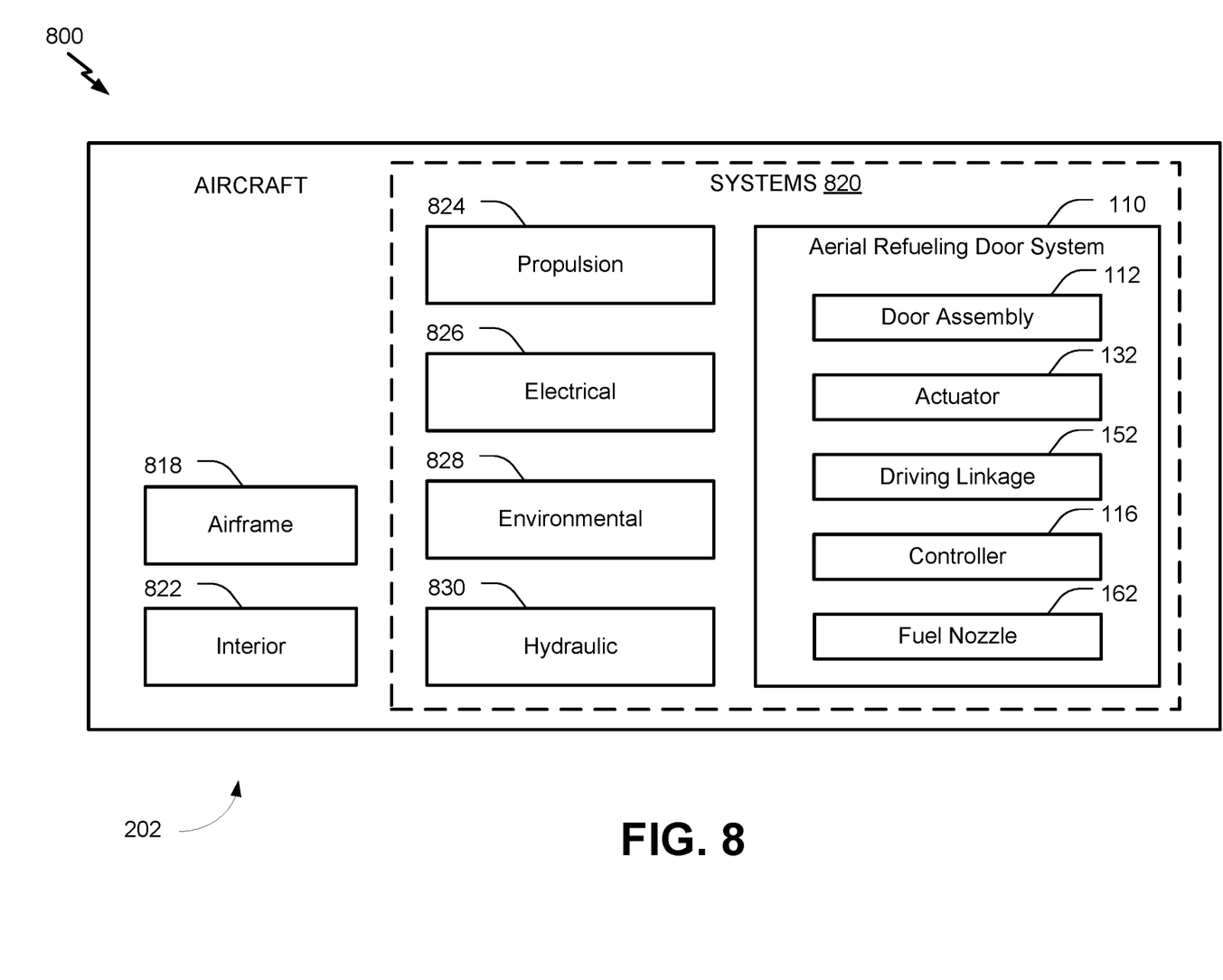
FIG. 8 is a block diagram of an illustrative implementation of an aircraft including a system for operating an aerial refueling door.

Referring to FIG. 8, a block diagram of an illustrative embodiment of the aircraft 202 (e.g., a commercial aircraft, a military aircraft, a tanker, a drone, etc.) is shown and designated 800. As shown in FIG. 8, the aircraft 202 includes an airframe 818, an interior 822, and a plurality of systems 820. The systems 820 include one or more of a propulsion system 824, an electrical system 826, an environmental system 828, a hydraulic system 830, and the aerial refueling door system 110. Although the aircraft 202 includes five systems in FIG. 8, the aircraft 202 may include more than five systems or fewer than five systems in other implementations.

The aerial refueling door system 110 includes the door assembly 112, the actuator 132, the driving linkage 152, the controller 116, and the fuel nozzle 162 of FIG. 1. The aerial refueling door system 110 may be configured to open and close the door assembly 112 responsive to commands received or generated by the controller 116, as described above with reference to FIGS. 1-7. The aerial refueling door system 110 is configured to protect the actuator 132 from loads experienced by the door assembly 112, while the door assembly 112 is open or closed. Additionally, the aerial refueling door system 110 is configured to maintain the door assembly 112 in a current state in response to a loss of power to or loss of function of the aerial refueling door system 110. For example, if the door assembly 112 is open and power to the actuator 132 is severed, the door assembly 112 will remain open.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:
1. An aircraft comprising:
   a torque transfer shaft;
   a door assembly;
   door linkages coupled to the door assembly and the torque transfer shaft;
   an actuator including a driveshaft, wherein the actuator is configured to open and close the door assembly via the door linkages; and
   a double on-center mechanical linkage coupled to the torque transfer shaft and the actuator, wherein the double on-center mechanical linkage is configured to have a first set of links in an on-center configuration when the door assembly is in an open state and a second set of links in an on-center configuration when the door assembly is in a closed state.
2. The aircraft of claim 1, wherein the actuator comprises a rotary electric actuator, and wherein the rotary electric actuator is located within a pressurized portion of the aircraft.
3. The aircraft of claim 1, wherein the door assembly is located in proximity to a nose of the aircraft, wherein the door assembly corresponds to an aerial refueling door, and wherein the door assembly is curved and configured to open outwards with respect to the aircraft.
4. The aircraft of claim 1, further comprising a controller configured to control operation of the actuator and to control a state of the door assembly.
5. The aircraft of claim 1, further comprising a limit switch coupled to the aircraft, the limit switch configured to generate a signal configured to cause deactivation of the actuator based on contact with a portion of the double on-center mechanical linkage.
6. The aircraft of claim 1, wherein the door assembly includes an aerial refueling door and further comprising:
   a fuel intake nozzle housed within a compartment partially enclosed by the door assembly;
   one or more fuel tanks in fluid connection with the fuel intake nozzle; and
   a refueling boom in fluid connection with the one or more fuel tanks, the refueling boom configured to refuel other aircraft in flight.
7. The aircraft of claim 1, wherein the double on-center mechanical linkage comprises:
   a drive link mechanically coupled to the actuator, wherein the drive link is configured to rotate about the driveshaft of the actuator;
   a first link rotatably coupled to the drive link, wherein the first link and the drive link form a first pivot point;
   a second link rotatably coupled to the first link, wherein the second link and the first link form a second pivot point;
   a support shaft coupled to second link, wherein the second link is configured to rotate about the support shaft;
   a third link rotatably coupled to the second link, wherein the third link and the second link form a third pivot point; and
   a fourth link rotatably coupled to third link and mechanically coupled to the door assembly, wherein the fourth link and the third link form a fourth pivot point, and wherein, when the door assembly is in the open state, the support shaft, the third pivot point, and the fourth pivot point are aligned.

8. The aircraft of claim 7, wherein, when the door assembly is in the closed state, the driveshaft, the first pivot point, and the second pivot point are aligned.
9. The aircraft of claim 7, wherein, when the door assembly is in the open state, the second pivot point is further aligned with the support shaft, the third pivot point, and the fourth pivot point.
10. The aircraft of claim 7, wherein the door assembly further comprises:
    a first door;
    a second door;
    a first door driving linkage coupled to the first door and coupled to the fourth link via a shaft, wherein the first door driving linkage is configured to open and close the first door; and
    a second door driving linkage coupled to the second door and coupled to the fourth link via a shaft, wherein the second door driving linkage is configured to open and close the second door.
11. The aircraft of claim 10, wherein the first door driving linkage includes:
    an input link;
    a coupler link rotatably coupled to the input link; and
    an output link rotatably coupled to the coupler link and coupled to the first door via an output shaft.
12. The aircraft of claim 7, wherein the actuator comprises a rotary electric actuator.
13. The aircraft of claim 7, wherein the support shaft coupled to the second link forms a bound pivot point, and wherein the support shaft is configured to absorb loads when the door assembly is in the open state and in the closed state.
14. The aircraft of claim 7, wherein the first pivot point, the second pivot point, and the third pivot point are moveable pivot points.
15. The aircraft of claim 7, wherein the first link, the second link, the third link, and the fourth link are substantially straight and move substantially in the same plane, and wherein the drive link, the first link, the second link, the third link, and the fourth link comprise the double on-center mechanical linkage.
16. A method of operating an aerial refueling door, the method comprising:
    responsive to rotation of a driveshaft of an actuator in a first direction, opening a door assembly via door linkages based on rotation of a torque transfer shaft coupled to the driveshaft of the actuator by a double on-center mechanical linkage, wherein opening the door assembly includes rotating a drive link about the driveshaft to drive a first link, rotating a second link about a support shaft, driving a third link, and rotating a fourth link mechanically coupled to the torque transfer shaft, and wherein the second link and the third link are aligned on-center when the door assembly is in an open state; and
    responsive to rotation of the driveshaft in a second direction, closing the door assembly via the door linkages based on rotation of the torque transfer shaft, wherein closing the door assembly includes rotating the drive link about the driveshaft to drive the first link, rotating the second link about the support shaft, driving the third link, and rotating the fourth link, and wherein the first link and at least a portion of the drive link are aligned on-center when the door assembly is in a closed state.
17. The method of claim 16, wherein the door assembly is located on an aircraft and is opened during flight, wherein the door assembly being in the open state enables access to a fuel intake nozzle, and further comprising, prior to closing the door assembly, receiving fuel from another aircraft via the fuel intake nozzle.

18. The method of claim 17, further comprising transferring the received fuel to an operational fuel tank, a refueling tank, or a fuel storage tank.

19. The method of claim 17, further comprising transferring the received fuel to a third aircraft via a refueling boom.

20. The method of claim 16, further comprising, when the door assembly is in the open state:
- receiving a load at the door assembly; and
- transferring the load to the support shaft.

* * * * *